(12) United States Patent
Thomson

(10) Patent No.: US 9,771,251 B2
(45) Date of Patent: Sep. 26, 2017

(54) GATHERING AND DISPENSING SCOOP WITH GATE VALVE

(71) Applicant: Susan A. Thomson, Spokane, WA (US)

(72) Inventor: Susan A. Thomson, Spokane, WA (US)

(73) Assignee: Susan Thomson, Spokane, WA (US)

( * ) Notice: Subject to any disclaimer, the term of this patent is extended or adjusted under 35 U.S.C. 154(b) by 34 days.

(21) Appl. No.: 14/803,498

(22) Filed: Jul. 20, 2015

(65) Prior Publication Data

US 2015/0323367 A1    Nov. 12, 2015

Related U.S. Application Data

(62) Division of application No. 13/673,705, filed on Nov. 9, 2012, now Pat. No. 9,120,662.

(51) Int. Cl.

| | |
|---|---|
| *B65D 47/26* | (2006.01) |
| *B65D 47/28* | (2006.01) |
| *B65D 88/26* | (2006.01) |
| *B67D 7/06* | (2010.01) |
| *B67C 11/04* | (2006.01) |
| *G01F 19/00* | (2006.01) |
| *B65B 39/00* | (2006.01) |
| *B67C 11/00* | (2006.01) |

(52) U.S. Cl.
CPC .............. *B67C 11/04* (2013.01); *B65D 47/26* (2013.01); *B65D 47/286* (2013.01); *B65D 88/26* (2013.01); *G01F 19/002* (2013.01); *G01F 19/007* (2013.01); *B65B 39/001* (2013.01); *B65B 39/002* (2013.01); *B65B 39/003* (2013.01); *B65B 39/004* (2013.01); *B67C 11/00* (2013.01)

(58) Field of Classification Search
CPC ... B65B 39/001; B65B 39/002; B65B 39/003; B65B 39/004; B67C 11/04; B67C 11/00; B65D 47/26; B65D 47/286; B65D 88/26; G01F 19/002; G01F 19/007
See application file for complete search history.

(56) References Cited

U.S. PATENT DOCUMENTS

| | | | | |
|---|---|---|---|---|
| 211,352 | A | * | 1/1879 | Smith ............... B67C 11/04 141/345 |
| 1,455,970 | A | | 5/1923 | Resek |
| 1,904,756 | A | | 4/1933 | Wooster |
| 2,162,286 | A | | 6/1939 | Siefert |
| 2,746,656 | A | | 5/1956 | Bradshaw |
| 3,344,958 | A | | 10/1967 | Kaanehe |
| 3,393,838 | A | | 7/1968 | Syverson |
| 3,643,704 | A | | 2/1972 | Carr |
| 3,774,810 | A | * | 11/1973 | Corsette ............ B65D 83/60 222/146.1 |

(Continued)

*Primary Examiner* — Frederick C Nicolas
(74) *Attorney, Agent, or Firm* — Randall Danskin P.S.

(57) ABSTRACT

A gathering and dispensing scoop with agitating gate valve provides a scoop body defining an upper opening, a bottom opening, and a channel extending therebetween. A handle extends radially from an outer peripheral surface of the scoop body. A gate valve transects the channel and has a user operable finger tab adjacent to the handle for a user to move the gate valve from a first position transecting the channel and obstructing the bottom opening to a second position wherein the gate valve no longer obstructs the channel and opens the bottom opening.

5 Claims, 10 Drawing Sheets

(56) References Cited

U.S. PATENT DOCUMENTS

| | | | |
|---|---|---|---|
| 4,023,602 A | 5/1977 | Sparr | |
| 4,176,767 A | 12/1979 | Franche | |
| 4,200,208 A * | 4/1980 | Hassenauer | B65D 90/54 222/505 |
| 4,287,921 A * | 9/1981 | Sanford | A47G 19/34 141/286 |
| 4,832,226 A * | 5/1989 | Leon | A47J 36/08 126/377.1 |
| 4,856,681 A | 8/1989 | Murray | |
| 5,271,568 A * | 12/1993 | Stevie | A01C 15/02 222/317 |
| 5,421,491 A | 6/1995 | Tuvim et al. | |
| 5,462,101 A * | 10/1995 | Mouchmouchian | A61J 7/0023 141/18 |
| 5,513,777 A | 5/1996 | Yoda et al. | |
| 5,622,285 A * | 4/1997 | Lee | A21C 15/005 222/158 |
| 5,711,452 A * | 1/1998 | Chaffin | A47G 19/2272 220/710.5 |
| 5,813,571 A * | 9/1998 | Gaucher | B05B 11/0043 222/105 |
| 5,884,523 A * | 3/1999 | Cheng | G01F 19/002 73/426 |
| 6,021,924 A * | 2/2000 | Suck | B05B 11/0043 222/105 |
| 6,189,742 B1 | 2/2001 | Thomson et al. | |
| 6,257,464 B1 * | 7/2001 | Dalton | A47F 1/03 222/560 |
| 6,315,170 B1 | 11/2001 | Thomson et al. | |
| 6,367,661 B1 * | 4/2002 | Valente | A21O 5/006 222/181.2 |
| 6,484,905 B1 | 11/2002 | Swackhamer et al. | |
| 7,472,810 B2 | 1/2009 | Amir | |
| 7,614,432 B2 * | 11/2009 | Shaw | B65B 39/001 141/345 |
| 8,118,184 B2 * | 2/2012 | Ruse, Jr. | B65D 43/0204 220/212 |
| 8,469,237 B2 | 6/2013 | Thulin | |
| 8,960,490 B2 * | 2/2015 | Carlile | B65D 47/249 220/254.5 |
| 2007/0045313 A1 * | 3/2007 | Holcomb | A47G 19/2272 222/469 |
| 2008/0099512 A1 | 5/2008 | Hoffman et al. | |
| 2010/0102059 A1 * | 4/2010 | Ruse, Jr. | B65D 43/0204 220/254.5 |
| 2010/0264166 A1 * | 10/2010 | Moretti | B05B 11/0043 222/105 |
| 2010/0276448 A1 * | 11/2010 | Moretti | B05B 11/0043 222/105 |
| 2011/0095053 A1 * | 4/2011 | Greiner-Perth | B05B 11/0018 222/105 |

* cited by examiner

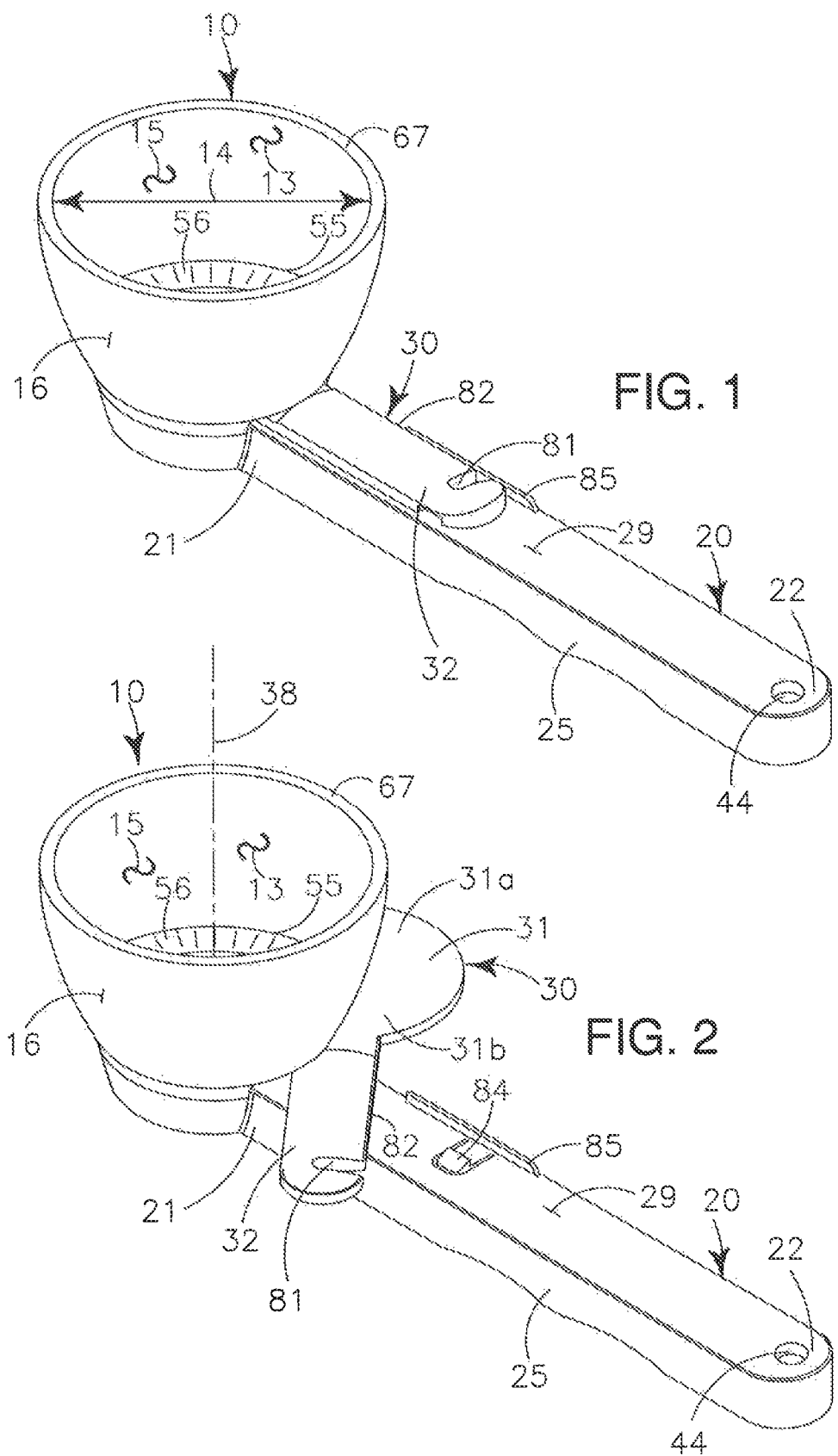

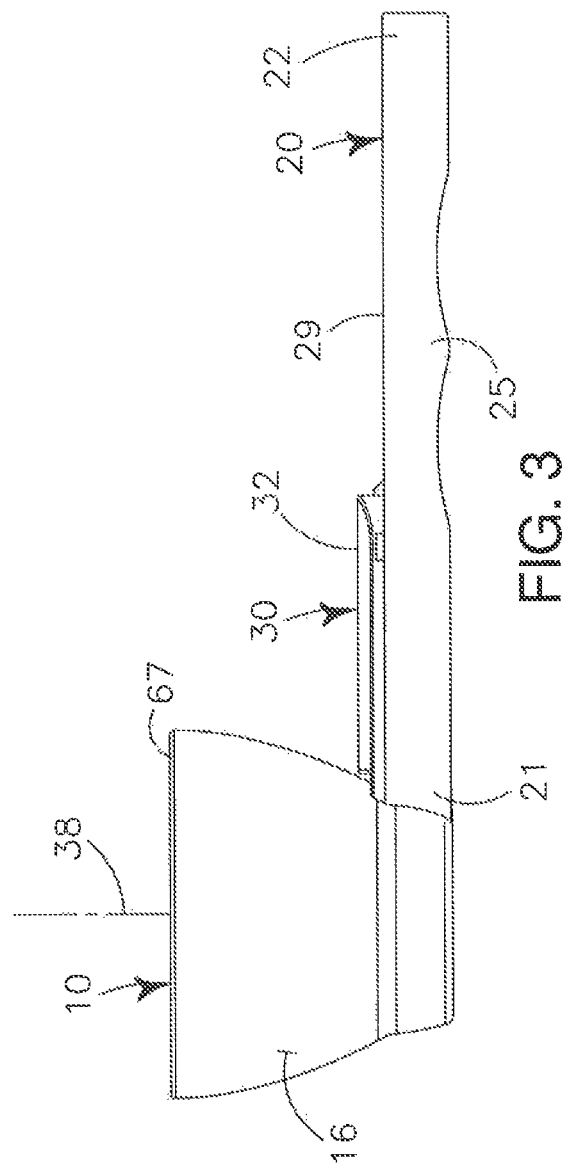
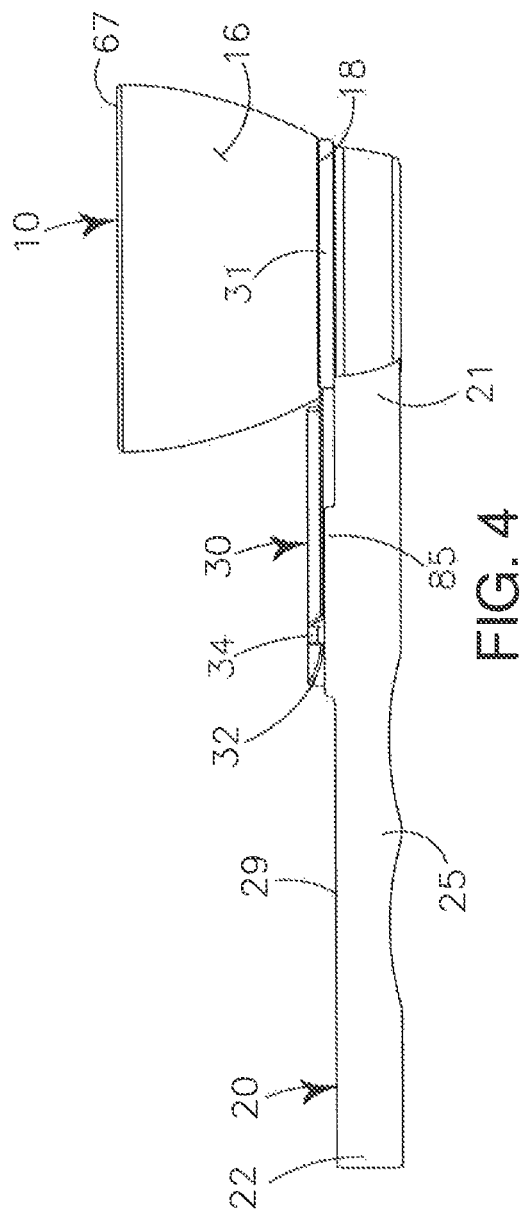

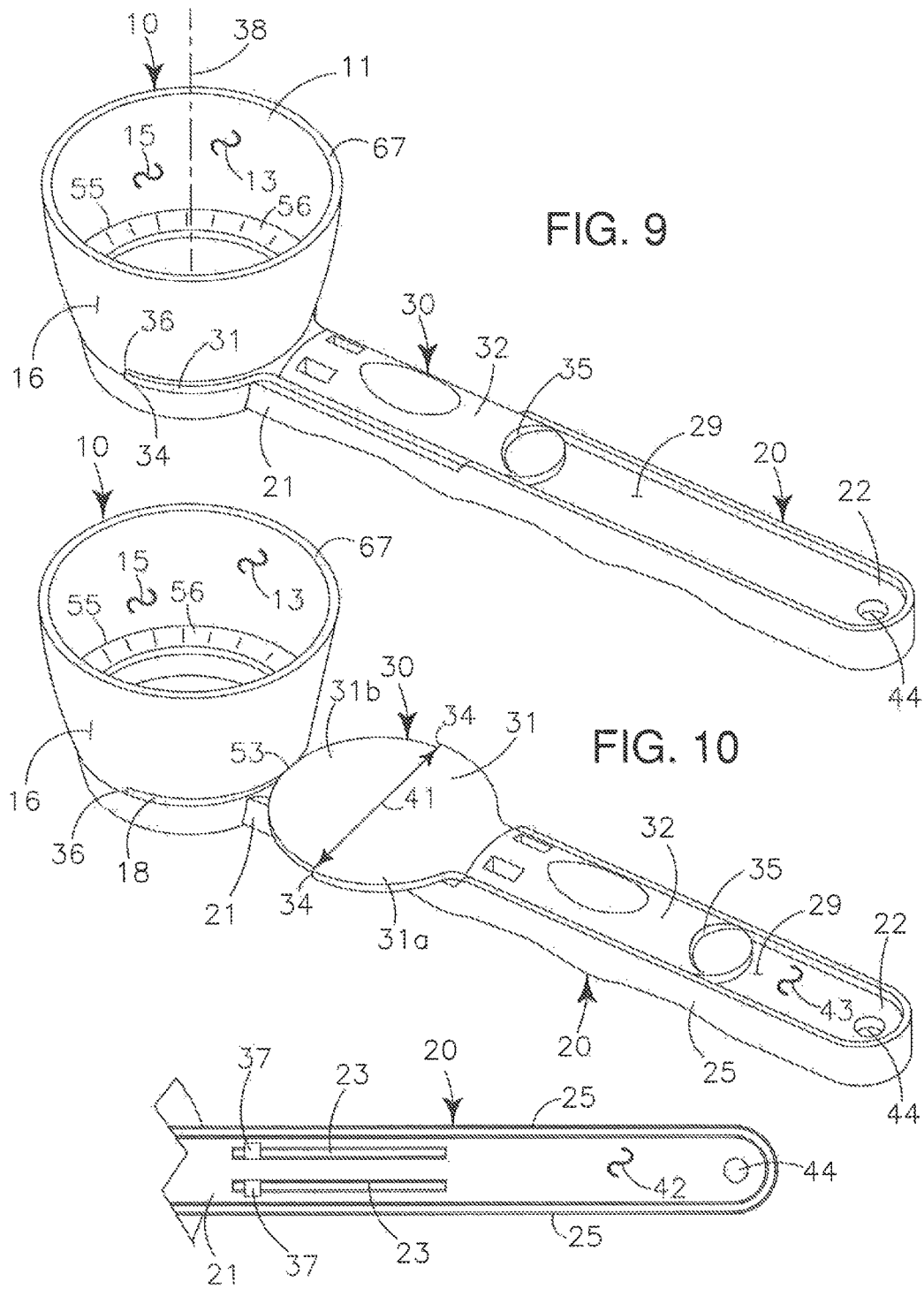

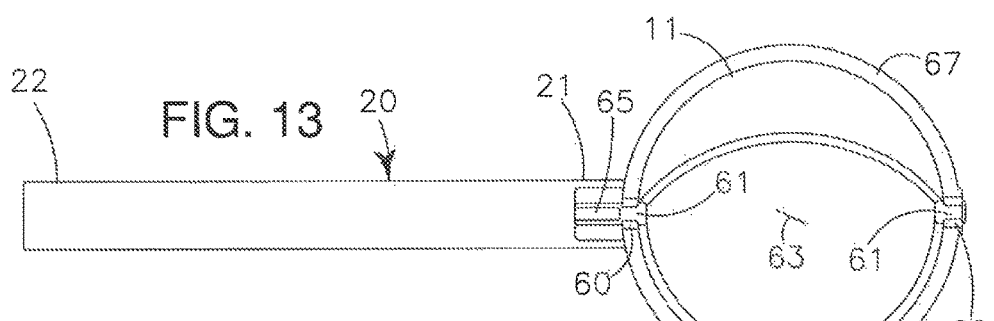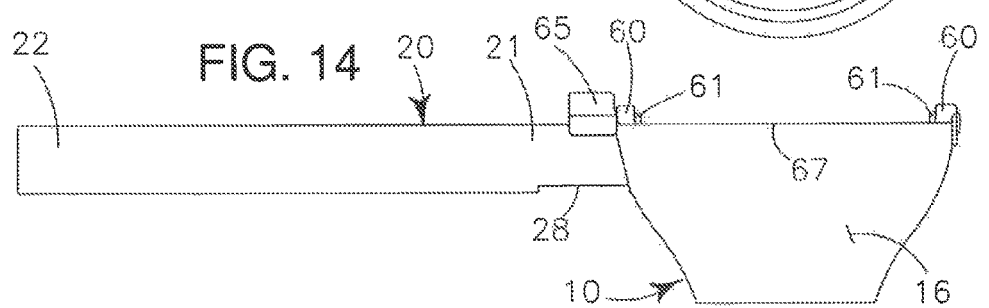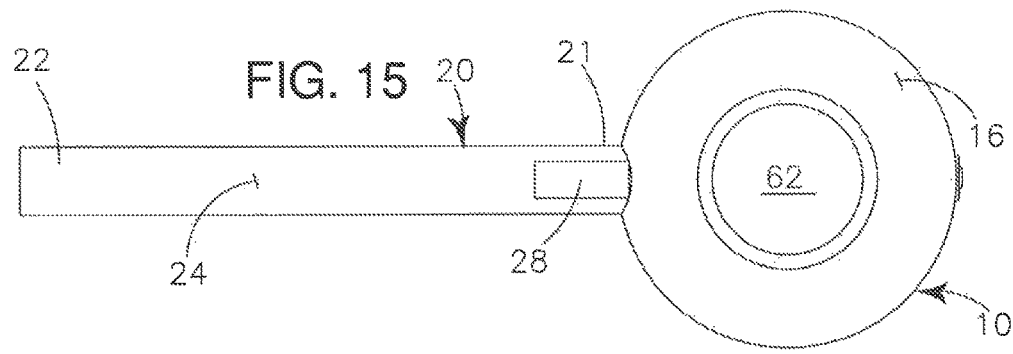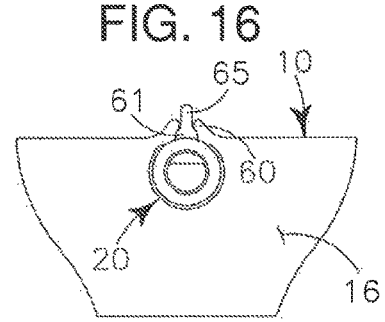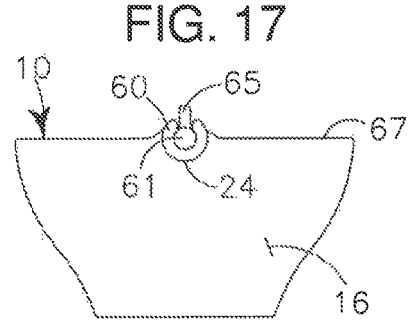

GATHERING AND DISPENSING SCOOP WITH GATE VALVE

RELATED APPLICATIONS

This utility patent application is a divisional application of currently pending U.S. application Ser. No. 13/673,705 filed on Nov. 9, 2012.

U.S. application Ser. No. 13/673,705 claims the benefit of earlier filed U.S. Provisional Patent Application No. 61/629,055 filed on Nov. 14, 2011. The entire contents of both aforementioned U.S. Ser. No. 13/673,705 and U.S. 61/629,055 are incorporated herein by this reference.

FIELD OF INVENTION

This invention relates to containers, and more particularly to containers used for gathering and dispensing predetermined quantities of flowable powders and particulated solids.

BACKGROUND OF THE INVENTION

For years the food supplement industry and sports drink industry (commonly soda drink manufacturers) hereinafter collectively referred to as the "nutrition industry" have produced and marketed fluidic products that are packaged in a manner that is ready to drink (RTD). Such RTD products are predominately available in single serving size containers and such containers are typically formed of plastic or metal alloys.

The nutrition industry also encompasses the production, packaging and distribution of a wide variety of powdered nutritional products that may be added to liquids such as, but not limited to, water, milk and juices. Powdered nutritional products include, but are not limited to, items such as baby formula, dietary supplements, sports drinks, vitamin additives and flavor additives.

The nutrition industry has discovered the manufacture and sale of nutritional products in powdered form is more economical than RTD products. Powdered products are easier and less costly to package and ship because powdered products weigh less and have less volume. Powdered products are dry and are generally not subject to spoilage with age. Further, powdered products encourage use of re-usable bottles and containers which has the added benefit of reducing the consumption of disposable plastic and metal containers allowing manufacturers to promote their product as "being green" and environmentally sensitive while increasing profit margins by reducing costs. Further still, powdered products allow consumers more freedom than would otherwise be available because a powered product can be easily transported and the drink may be made when needed. For example, parents with infants might be prevented from traveling if there was no ability to make infant formula during lengthy periods of travel on an airplane because refrigeration may not be available and because transport and storage of liquids may be problematic or even prohibited by aviation security regulations.

The nutrition industry has responded to these needs by producing single serving size "tubes" of powdered mixes that are easily transportable. Unfortunately, such "tubes" and single size serving packaging have increased pollution of paper and plastic products, encouraged the use of single serving size bottles of water and prevented end-consumers from adjusting the concentration of the product added to a quantity of liquid to adjust for taste. My dispensing scoop with gate valve resolves various of these continuing drawbacks and problems by providing end-consumers with the ability to adjust for taste and reducing the need for single use containers.

Various types of packaging and containers are used in the powdered nutritional product industry, including but not limited to, waxed cardboard containers, plastic jugs, metal containers and "tubs" of various sizes. Typically such containers carry a bulk quantity of product, which may be accessed through a large opening orifice generally defined in a top portion of the container. Because the products are commonly sold in bulk quantities, the opening orifice defined in the container typically has a removable and re-sealable top and is large enough for a user to insert at least a portion of his/her hand into the container while gripping a tool, such as a spoon or scoop for gathering a quantity of the product and for transferring the product to an end-use container, such as a baby bottle or a water bottle.

If a spoon, such as a teaspoon or tablespoon, is used to gather product from the container and transfer the product to an end-use container, it is difficult to consistently gather and thereafter dispense a consistent quantity of the product because the product is typically "heaped" upon the spoon. This can be a significant issue when calorie control is important. Although a spoon defines a generally concave depression, a spoon generally does not have sufficiently tall perimeter walls surrounding the concave depression to prevent some portion of the product from "sloughing off" the edges of the spoon. As a result, when using a spoon, it is difficult to control the quantity of the product being gathered and thereafter dispensed. Further, although spoons are typically tapered at a "nose end" portion opposite a handle, spoons do not readily facilitate depositing the product into any end-use container that has an opening orifice smaller than a side-to-side dimension of the spoon. The result is that some portion of the product falls outside the opening orifice to the end-use container, causing a mess and waste of the product. This problem may be even greater if the person using the spoon does not have sufficient hand coordination and dexterity, for instance young children.

One alternative to the use of spoons for gathering, and thereafter dispensing such products, has been to include a scoop within the original packaging of the product and the scoop or spoon may be configured and sized for gathering a specified quantity of the product for addition to a predetermined quantity of liquid, for instance one scoop of product per 12 ounces of water. Scoops make gathering and dispensing a consistent quantity of the product easier, but scoops also have continuing drawbacks. Scoops typically have small short handles that require a user to insert his/her entire hand into the product container to gather the product. In addition, it is often difficult to fill and difficult to empty the material from the scoop. These drawbacks are exacerbated by the structure of known scoops and by the fact that many powdered nutritional products, such as infant formula, are a very finely powdered particulate.

Scoops formed by injection molding and vacuum forming have generally planer bottom portions and integrally connected side walls, defining an air tight volume. Such air tight volumes allow air pockets to form within the scoop as the product is being scooped up. Such air pockets prevent the scoop from filling completely with the powdered product. If the scoop does not fill completely, the amount of product being gathered and thereafter deposited into an end-use container such as a baby bottle is not adequate to create the desired/intended nutritional concentration. Another drawback to air tight scoops occurs when the scoop is completely filled with product. A vacuum may form within the volume, causing the product contained within the volume to not "release" for depositing into the end-use container such as a baby bottle without agitation to release the vacuum. Further, and similar to the use of tableware spoons, after the scoop is filled with a quantity of product, the scoop needs to be inverted over the opening orifice of the end-use container to empty the product. Inversion of the scoop frequently leads to spillage of the product, and in many instances the scoop will have an opening orifice that is larger than the opening orifice of the end-use container which leads to the same problem experienced with spoons, the powdered material falling on the outside of the end-use container rather than passing through the opening orifice and into the end-use container. Again, the end result is inconsistent quantities of the powdered nutritional material being added to the end-use container and difficulty gathering and dispensing the powdered material. Finally, many known scoops have a generally planer handle that extends radially from an upper edge portion of the scoop volume. The planer handle adjacent the scoop volume has a tendency to collect an amount of the product being scooped up thereon and unless this "build up" is manually "brushed away" there is additional spillage when the scoop is inverted for emptying.

Admittedly scoops have resolved some of the problems encountered by users of powdered nutritional products. However, scoops have not solved all of the problems associated with consistently gathering and dispensing consistent quantities of powdered nutritional supplements into end-use containers that have opening orifices smaller than the diameter of a spoon or scoop. Therefore, there remains a need for a device which resolves these continuing needs.

My gathering and dispensing scoop with gate valve resolves various of the continuing problems associated with gathering and dispensing consistent quantities of powdered and finely particulated products into end-use containers. My invention has a scoop body defining a volume, an agitating gate valve, and a handle extending radially from the scoop body. The volume is not air-tight so that air pockets do not form within the volume while product is being gathered and to prevent a vacuum which might prevent product from dispensing from the volume. The agitating gate valve breaks surface tension that may form in powdered products to encourage the product to "release" from the volume for dispensing. My gathering and dispensing scoop with gate valve need not be inverted to dispense product into an end-use container because the agitating gate valve optionally opens and closes an orifice defined in a bottom of the scoop body so that the product within the volume may be deposited into an end-use container.

A dispensing chute may be attached to a bottom portion of the scoop body and the chute may have peripheral walls that taper inwardly, and may further include steps defined therein for frictional engagement with a rim of an opening orifice of a end-use container so that the dispensing chute may be accurately and consistently placed upon the end-use container for depositing product therein without spillage even by persons lacking hand coordination and dexterity such as young children. Inner surfaces of the dispensing chute are linear and smooth, without steps or ridges, so that product within the volume slides therealong and thereacross for passage into the end-use container.

The agitating gate valve is moveable and is manipulated by a user to open and close the gate valve as desired. The structure of my gathering and dispensing scoop with gate valve allows single-hand (left or right) and single-finger use which is of paramount importance especially for parents who may be attempting to make a bottle of infant formula while holding an infant in their arms.

Some or all of the problems explained above, and other problems, may be helped or solved by my invention shown and described herein. My invention may also be used to address other problems not set out herein or which become apparent at a later time. The future may also bring to light unknown benefits which may be in the future appreciated from the novel invention shown and described herein.

SUMMARY

A gathering and dispensing scoop with agitating gate valve provides a scoop body defining an upper opening, a bottom opening, and a channel extending therebetween. A handle extends radially from an outer peripheral surface of the scoop body. A gate valve transects the channel obstructing the bottom opening forming a volume within the body and has a user operable finger tab adjacent to the handle. A dispensing chute communicating with the channel and carried by scoop body adjacent the bottom opening provides for frictional engagement with opening orifice rim of an end-use container.

In providing such a gathering and dispensing scoop with gate valve it is:

a principal object to provide a gathering and dispensing scoop having a one-finger operable gate valve.

a further object to provide a gathering and dispensing scoop that does not need to be inverted to empty contents therefrom.

a further object to provide a gathering and dispensing scoop that does not form air pockets while gathering product.

a further object to provide a gathering and dispensing scoop that does not create a vacuum when emptying contents therefrom.

a further object to provide a gathering and dispensing scoop having a gate valve that agitates product within the channel when the gate valve is operated.

a further object to provide a gathering and dispensing scoop having a gate valve that optionally obstructs the bottom opening.

a further object to provide a gathering and dispensing scoop having a gate valve that transects the medial channel by sliding thereacross.

a further object to provide a gathering and dispensing scoop having a gate valve that is flat.

a further object to provide a gathering and dispensing scoop having a gate valve that pivots on an axis of rotation.

a further object to provide a gathering and dispensing scoop having a gate valve that pivots on two axes of rotation.

a further object to provide a gathering and dispensing scoop that is operable with a left hand and with a right hand.

a further object to provide a gathering and dispensing scoop defining a volume that is not air tight.

a further object to provide a gathering and dispensing scoop that provides consistent uniform dosing.

a further object to provide a gathering and dispensing scoop that has a dispensing chute for depositing contents in an end-use container without spillage.

a further object to provide a gathering and dispensing scoop that consistently completely fills with product and consistently completely empties product therefrom.

a further object to provide a gathering and dispensing scoop for use with powdered infant formula and baby bottles.

a further object to provide a gathering and dispensing scoop for use with small-neck water bottles.

a further object to provide a gathering and dispensing scoop for use with finely particulated, flowable nutritional supplements.

a further object to provide a gathering and dispensing scoop having a spring-biased gate valve.

a further object to provide a gathering and dispensing scoop that promotes use of powdered products to reduce pollution and reduce use of RTD products in disposable containers.

a further object to provide a gathering and dispensing scoop that is stackable with similar scoops of differing size volumes.

a still further object to provide gathering and dispensing scoop for powdered nutritional products that is of new and novel design, of rugged and durable nature, of simple and economic manufacture, and one that is otherwise well-suited to the uses and purposes for which it is intended.

Other and further objects of my invention will appear from the following specification and accompanying drawings which form a part herein. In carrying out the objects of my invention, it is to be understood that its structures and features are susceptible to change in design and arrangement and size, with only one preferred and practical embodiment of the best known mode being illustrated in the accompanying drawings and specified as is required.

BRIEF DESCRIPTION OF THE DRAWINGS

Specific forms, configurations, embodiments and/or diagrams relating to and helping to describe preferred versions of the invention are explained and characterized herein, often with reference to the accompanying drawings. The drawings and all features shown therein also serve as part of the disclosure of the invention whether described in text or merely by graphical disclosure alone. Such drawings are briefly described below.

FIG. 1 is an isometric top, side and handle end view of my dispensing scoop showing the gate valve in a closed position.

FIG. 2 is an isometric top, side and handle end view of my gathering and dispensing scoop showing the gate valve pivoted to an open position.

FIG. 3 is an orthographic first side view of the gathering and dispensing scoop of FIG. 1.

FIG. 4 is an orthographic second side view of the gathering and dispensing scoop of FIG. 1.

FIG. 9 is an isometric top, first side and handle end view of a second embodiment of my gathering and dispensing scoop having an agitating gate valve that slides axially along the handle showing the gate valve in a closed position.

FIG. 10 is an isometric top, first side and handle end view similar to that of FIG. 9 showing the agitating gate valve in an open position.

FIG. 10*a* is an orthographic, partial cut-away bottom upward looking view of the gathering and dispensing scoop handle of FIG. 9 showing the gate valve tracks and the lug tabs.

FIG. 13 is an orthographic, top downward looking view of the gathering and dispensing scoop of FIG. 11.

FIG. 14 is an orthographic second side view of the gathering and dispensing scoop of FIG. 11, the first side being the same.

FIG. 15 is an orthographic bottom upward looking view of the gathering and dispensing scoop of FIG. 11.

FIG. 16 is an orthographic handle end view of the gathering and dispensing scoop of FIG. 11.

FIG. 17 is an orthographic scoop body end view of the gathering and dispensing scoop of FIG. 11.

DETAILED DESCRIPTION OF THE PREFERRED EMBODIMENTS

Introductory Notes

Figure 5:
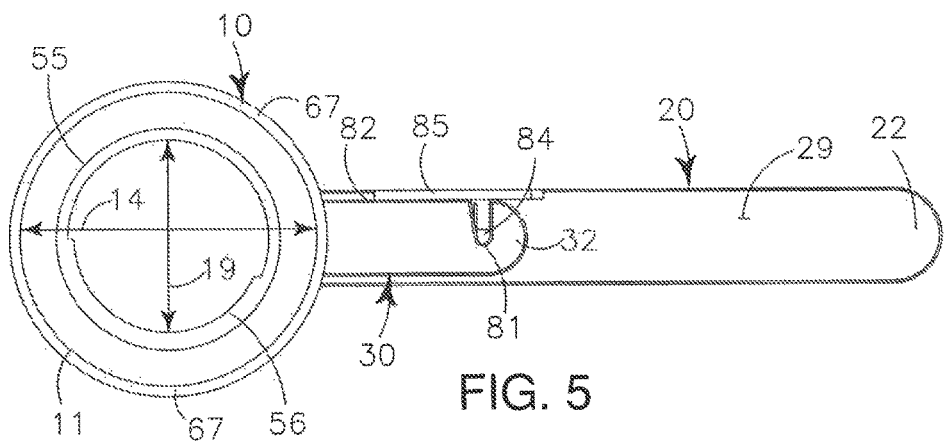
FIG. 5 is an orthographic top downward looking view of the gathering and dispensing scoop of FIG. 1.

The readers of this document should understand that the embodiments described herein may rely on terminology used in any section of this document and other terms readily apparent from the drawings and the language common therefore as may be known in a particular art and such as known or indicated and provided by dictionaries. Dictionaries were used in the preparation of this document. Widely known and used in the preparation hereof are *Webster's Third New International Dictionary* (© 2093), *The Oxford English Dictionary* (Second Edition, ©2089), *The New Century Dictionary* (©2001-2005) and *The American Heritage Dictionary of the English Language* (4th Edition ©2000) all of which are hereby incorporated by reference for interpretation of terms used herein and for application and use of words defined in such references to more adequately or aptly describe various features, aspects and concepts shown or otherwise described herein.

This document is premised upon using one or more terms or features shown in one embodiment that may also apply to or be combined with other embodiments for similar structures, functions, features and aspects of the invention and provides additional embodiments of the invention. Wording used in the Claims is also descriptive of the invention and the text of both the Claims and the abstract are incorporated by reference into the description entirely. Terminology used with one, some or all embodiments may be used for describing and defining the technology and exclusive rights associated herewith.

The readers of this document should further understand that the embodiments described herein may rely on terminology and features used in any section or embodiment shown in this document and other terms readily apparent from the drawings and language common or proper therefore.

The term "product" as used herein is to be understood as including without limitation powdered products, granulated products, particulated solids and flowable solids and the like that may be gathered into the scoop by a user and thereafter dispensed from the scoop into another container. Although primarily directed at dry flowable finely particulated solids intended for combination with a liquid such as, but not limited to, powdered baby formula and nutritional supplements, the term "product" as used herein is inclusive of all products and materials gathered and dispensed with the scoop.

Overview of the Apparatus

My gathering and dispensing scoop with gate valve generally provides a scoop body 10, a handle 20 and a gate valve 30.

The scoop body 10 defines an upper opening 11 having a diameter 14, a bottom opening 12 having a diameter 19 and a channel 13 extending from the upper opening 11 to the bottom opening 12. The channel 13 has an axis 38 and defines a volume 15 when the bottom opening 12 is obstructed by the gate valve 30. The volume 15 is sized so that a predetermined quantity of product (not shown) may be gathered within the scoop body 10 for transfer to and dispensing into another container such as a water bottle (not shown) or baby bottle (not shown). Volume 15 of the scoop body 10 may vary from scoop to scoop by changing the dimensions of the body 10 such as by changing the diameter 14 of the upper opening 11 and the diameter 19 of the bottom opening 12 and/or by increasing a depth of the channel 13 to create scoops for gathering and dispensing different quantities of product.

Handle 20 is rigid and extends generally radially from the scoop body 10. The handle 20 has a first end portion 21 proximate the scoop body 10 and a second end portion 22 distal from the scoop body 10. The handle 20 is structurally interconnected with an outer circumferential wall 16 of the scoop body 10 to provide ease of manipulation of the scoop body 10.

The gate valve 30 is somewhat planer, having a generally disc-shaped channel blocking portion 31 at one end portion, and a handle portion 32 extending radially from the channel blocking portion 31. The channel blocking portion 31 is of a size to completely transect the channel 13 adjacent the bottom opening 12 obstructing the channel 13 so that a user may gather and transport a predetermined quantity of product (not shown) within the volume 15. The channel blocking portion 31 of the gate valve 30 communicates with the scoop body 10 and transects the channel 13 by moving through a gate valve slot 18 defined in the outer circumferential wall 16 of the scoop body 10.

An annular ring 55 may be carried within the volume 15 adjacent immediately above the gate valve slot 18 and extending circumferentially about the interior of the channel 13. The annular ring 55 has an outer circumferential surface (not shown) that is complimentary to the interior surface of the channel 13 and an inner circumferential surface 56 that tapers radially inwardly and downwardly toward the bottom opening 12. The annular ring 55 and its tapered inner circumferential surface 56 imparts some amount of radially inward movement to product (not shown) passing there-over when the product (not shown) is exiting the volume 15 through the bottom opening 12. The position of the annular ring 55 adjacent immediately above the gate valve slot 18 tends to prevent product (not shown) from flowing out through the gate valve slot 18 when the gate valve 30 is opened. In another embodiment (not shown) the same effect of imparting some amount of radially inward movement to the product to prevent the product from flowing outwardly through the gate valve slot 18 may be accomplished by thickening the body 10 adjacent above the gate valve slot 18 which may be accomplished during formation of the body 10, so that the diameter 19 of the bottom opening 12 is diametrically smaller adjacent immediately above the gate valve 30 than the diameter 19 is immediately below the gate valve 30.

As shown in FIG. 2, the gate valve 30 pivots relative to the handle 20 on a pivot axle 80 (FIG. 6) that extends through top surface 29 of the handle 20. The pivoting motion of the slide gate 30 relative to the scoop body 10 causes the channel blocking portion 31 of the slide gate 30 to enter the gate valve slot 18 defined in the scoop body 10. As the gate valve 30 pivots about pivot axle 80 the handle end portion 32 of the gate valve 30 pivots opposite the channel blocking portion 31.

A locking notch 81 is defined in a first lateral edge portion 82 of the handle portion 32 opposite the channel blocking portion 31. A locking tab 84 is carried on the top surface 29 of the handle 20 and is configured and biased to releasably engage with the locking notch 81 when the gate valve 30 is pivoted to a closed position (FIG. 1). A rotation limiting lip 85 is carried on a lateral edge of the handle 20 and extends vertically upwardly therefrom generally medially between the first end portion 21 and the second end portion 22 and spacedly adjacent the locking tab 84. The rotation limiting lip 85 provides a physical limit upon the pivotal rotation of the gate valve 30 and provides the user with a visual indicator of when the gate valve 30 is fully closed. Further, the rotation limiting lip 85 tends to prevent any "pinching" a user's skin or finger during the closing and opening of the gate valve 30.

Figure 6:
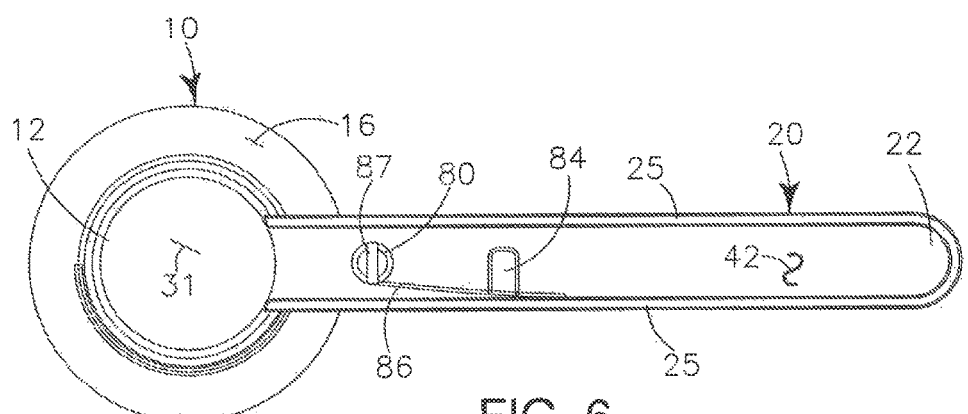
FIG. 6 is an orthographic bottom upward looking view of the gathering and dispensing scoop of FIG. 1 showing the biasing spring.
Figure 7:
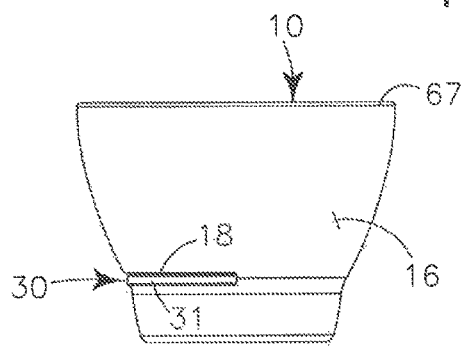
FIG. 7 is an orthographic scoop body end view of the gathering and dispensing scoop of FIG. 1.
Figure 8:
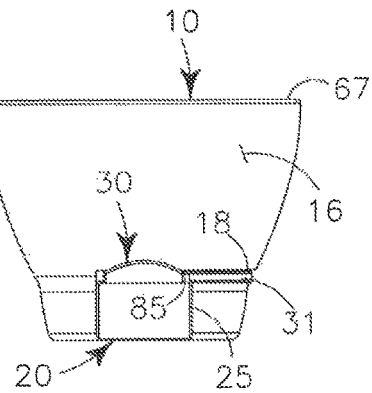
FIG. 8 is an orthographic handle end view of the gathering and dispensing scoop of FIG. 1.
Figure 11:
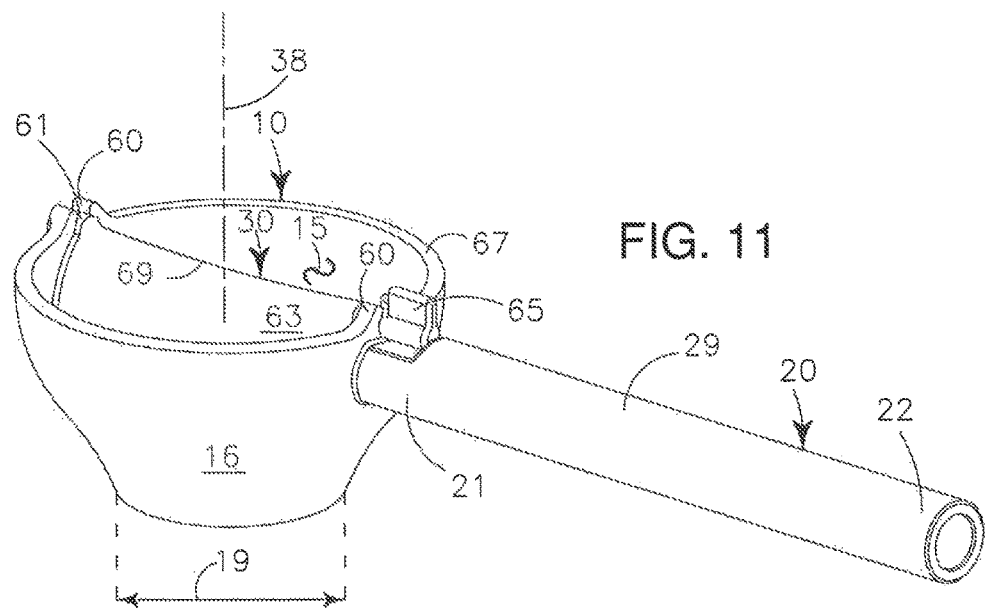
FIG. 11 is an isometric top, first side and handle end view of a third embodiment of my gathering and dispensing scoop having a sector shaped agitating gate valve that pivots on two pivot axles showing the gate valve in a closed position.

As shown in FIG. 6, the gate valve 30 may be biased to an open position, or to a closed position by spring 86 which communicates with the pivot axle 80. In the preferred embodiment the spring 86 engages with a diametric notch 87 defined in the pivot axle 80. Depending upon the position and tension of the spring 86, the gate valve 30 may be biased to either an open position (FIG. 2) or to a closed position (FIG. 1) depending upon the users desire. If the gate valve 30 is biased by spring 86 to an open position, engagement of the locking tab 84 with the locking notch 81 will retain the gate valve 30 in a closed position until the user operates the locking tab 84 which responsively disengages from the locking notch 81 and releases the gate valve 30 to pivot about pivot axle 80 under the biasing of spring 86 to cause the gate valve 30 to open allowing product (not shown) within the volume 15 to pass through the bottom opening 12.

Figure 20:
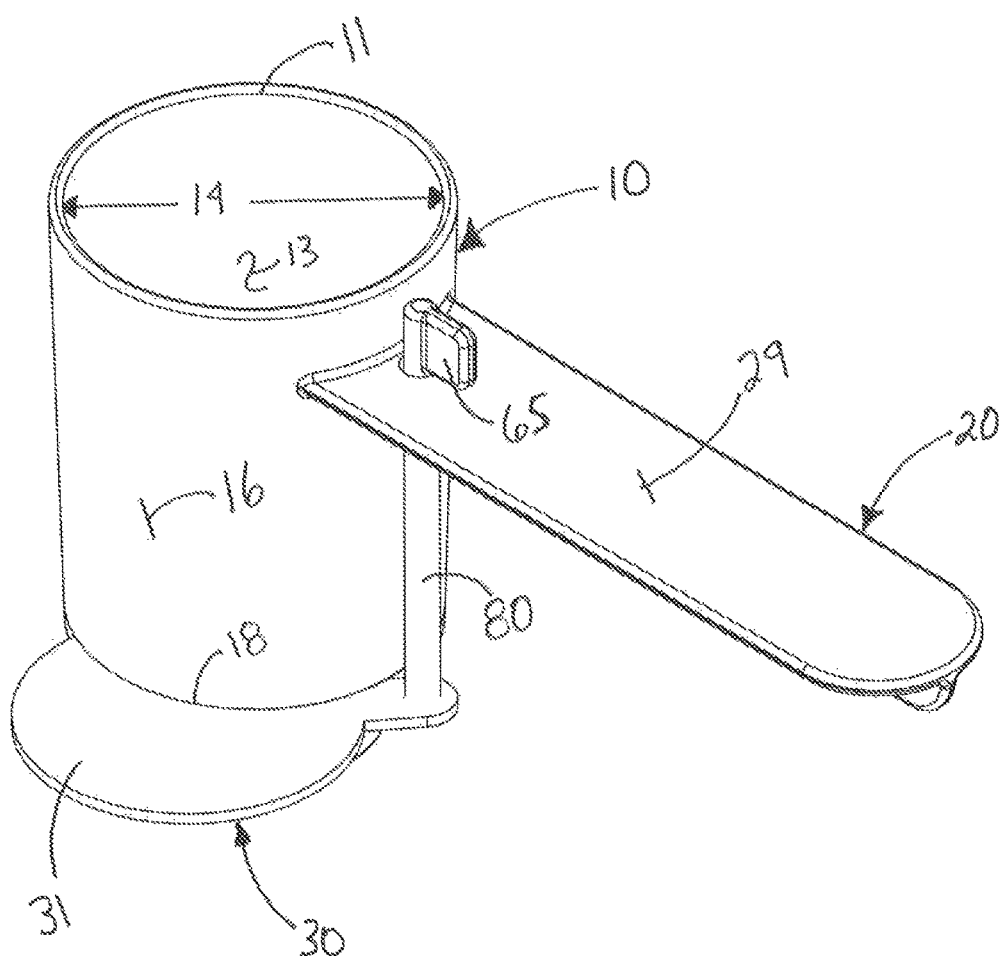
FIG. 20 is an isometric top, first side and handle end view of a fourth embodiment of my gathering and dispensing scoop showing the handle and the agitating gate valve vertically offset from one another and the agitating gate valve pivoted to a partially open position.

If the spring 86 is configured and oriented to bias the gate valve 30 to a closed position, operator activation of the locking tab 84 allows the user to pivot the handle end portion 32 of the gate valve 30 laterally outwardly away from the rotation limiting lip 85 with the user's thumb. As the handle end portion 32 pivots outwardly about the pivot axle 80 the channel blocking portion 31 pivots outwardly from the gate valve slot 18 responsively removing the obstruction from the bottom opening 12 and allowing product (not shown) to pass therethrough. FIG. 20 shows a similar embodiment of the scoop with the gate valve 30 vertically offset from the handle 20 by a pivot axle 80.

In a second embodiment, (FIGS. 9, 10 and 10a) the gate valve 30 is somewhat planer, having a generally disc-shaped channel blocking portion 31 at one end portion, and a handle portion 32 extending radially from the channel blocking portion 31. Channel blocking portion 31 has a diameter 14 sized and configured to completely transect the channel 13 adjacent the bottom opening 12 so that a user may gather and transport a predetermined quantity of product (not shown) within the volume 15. The gate valve 30 communicates with the scoop body 10 and transects the channel 13 by moving through a slide gate slot 18 defined in outer circumferential wall 16 of the scoop body 10 adjacent the interconnection of the scoop body 10 and the handle 20.

The handle portion 32 of the gate valve 30 defines a finger grip 35 that may have various known configurations and sizes to promote engagement with a user's finger (not shown) during use, such as but not limited to, a raised ridge or a grip enhancing surface texture.

Gate valve track 23 is defined in the handle 20 and extends radially away from the scoop body 10. As shown in FIG. 10a, two parallel spacedly adjacent gate valve tracks 23 are defined in the handle 20, with one gate valve track 23 proximate each lateral edge of the handle 20. Lugs (not shown) are carried on a bottom surface of the handle portion 32 and extend generally perpendicularly therefrom in a downward direction. Tabs 37 are carried on end portions of the lugs (not shown) opposite the handle portion 32 and provide positional maintenance of the gate valve 30 within the gate valve tracks 23 defined in the handle 20. Lateral edge portions 25 of the handle 20 extend perpendicularly relative to top surface 29 of the handle 20 forming a recess 42 on an underside of the handle 20 so that the lugs (not shown) and tabs 35 do not strike the user's hand during operation of the gate valve 30. The lateral edge portions 25 are curvilinear on bottom edge portions to create an ergonomic and user friendly "feel" and "grip" within a user's hand. The lateral edge portions 25 of the handle 20 may also extend upwardly above top surface 29 of the handle 20 forming a recess 43 to guide movement of the handle portion 32 of the gate valve 30 as it moves along the top surface 29 of the handle 20 during operation. A hole 44 may be defined in the handle 20 opposite the scoop body 10 to allow the scoop to hang upon a hook or the like for storage.

As the gate valve 30 slides along the handle 20 the lugs (not shown) carrying tabs 27 move within the slide gate tracks 23. Movement of the gate valve 30 along the handle 20 allows the channel blocking portion 31 to pass into and also be withdrawn from the gate valve slot 18, defined within the scoop body 10. When the channel blocking portion 31 of the gate valve 30 is inserted through the gate valve slot 18, the channel blocking portion 31 transects the channel 13, so that the channel 13 defines volume 15. When the channel blocking portion 31 of the gate valve 30 is drawn rearwardly away from the scoop body 10 (FIG. 10), the channel blocking portion 31 of the gate valve 30 is nearly completely withdrawn from the gate valve slot 18 allowing product contained within the volume 15 to pass downwardly through the bottom opening 12 and into an end-use container (not shown).

Best shown in FIG. 10, half 31a of the channel blocking portion 31 proximate the handle portion 32 is diametrically larger than half 31b of the channel blocking portion 31 opposite the handle portion 32. The diametric enlargement of the channel blocking portion 31a provides two diametrically opposed, radially extending ledges 34 that extend radially outwardly from peripheral edge of the channel blocking portion 31. The ledges 34 frictionally communicate with terminal edge portions 36 of the gate valve slot 18 that are diametrically opposite one another, and approximately 90° offset from a center line (not shown) of the radially extending handle 20. The ledges 34 provide a secure and firm mechanical interconnection between the gate valve 30 and the scoop body 10 when gate valve 30 is transecting the channel 13. As shown in FIG. 10, when the gate valve 30 is fully retracted from the channel 13, terminal end portion 53 of the channel blocking portion 31, is completely withdrawn from the channel 13 but is not completely withdrawn from the gate valve slot 18, so that the gate valve 30 is positionally maintained on the handle 20 and remains in alignment with the gate valve slot 18.

In a third embodiment (FIGS. 11-17), the scoop body 10 is somewhat hemispherical in shape defining a concave channel 13 having an upper opening 11 that is diametrically larger than a bottom opening 12. Axle supports 60 are carried at diametrically opposite positions on an upper circumferential edge 67 of the upper opening 11 and are radially aligned with the handle 20. The axle supports 60 positionally maintain and rotatably carry a sector shaped gate valve 30 on pivot axles 61 that extend radially outwardly from diametrically opposed positions on the sector shaped gate valve 30. The axle supports 60 may have a variety of known configurations to positionally maintain the pivot axles 61 therein while allowing operator initiated rotation of the sector shaped gate valve 30 on pivot axles 61. Such configurations may include, but not be limited to one or two upwardly opening "C" shaped structures that allow pivot axles 61 to be "snapped" into and out of the axle supports 60, and also perhaps axle holes (not shown) into which end portions (not shown) of pivot axles 61 may be inserted.

The gate valve 30 has a configuration similar to the concave shape of the channel 13 and is sized so that the gate valve 30 is movably carried within the channel 13 with the pivot axles 61 engaged within the axle supports 60. The gate valve 30 has a configuration similar to a sector of a hollow sphere such that an exterior (bottom) surface 62 of the gate valve 30 is convex in shape while an interior (upper) surface 63 of the gate valve 30 is concave in shape similar to the interior concave hemispherical shape of the channel 13. The size of the gate valve 30 is such that its exterior bottom surface 62 is immediately spacedly adjacent inner surface 64 of the channel 13 and yet is movable there-within on the pivot axles 61. Lateral edge portions 69 of the gate valve 30 are tapered toward the edges to have a minimal cross-ssectional thickness and an angle 70 between the opposing lateral edge portions 69 relative to an axis of rotation 71 is preferably about 135 degrees but may be as much as 150 degrees and as little as 40 degrees depending upon the diameter 19 of the bottom opening 12. It is essential that the angle 70 be sufficiently large that the gate valve 30 completely obstructs the bottom opening 12 when the gate valve 30 is in a closed position. Necessarily, the spaced apart lateral edge portions 69 must have a distance therebetween that is larger than the diameter 19 of the bottom opening 12. In the preferred embodiment, when one lateral edge 69 of the gate valve 30 is equal in height with the upper circumferential edge 67 of the scoop body 10, the opposing lateral edge 69 of the gate valve 30 is adjacent circumferential edge (not shown) of the bottom opening 12 and the bottom opening 13 is obstructed by the gate valve 30. Such a configuration lessens any spillage that might occur by material being "pushed" out of the volume 15 by a lateral edge 69 of the gate valve 30. It is to be understood however that the scoop body 10 and the gate valve 30 may have shapes other than hemispherical, or round, such as but not limited to, oval shapes.

Figure 12:
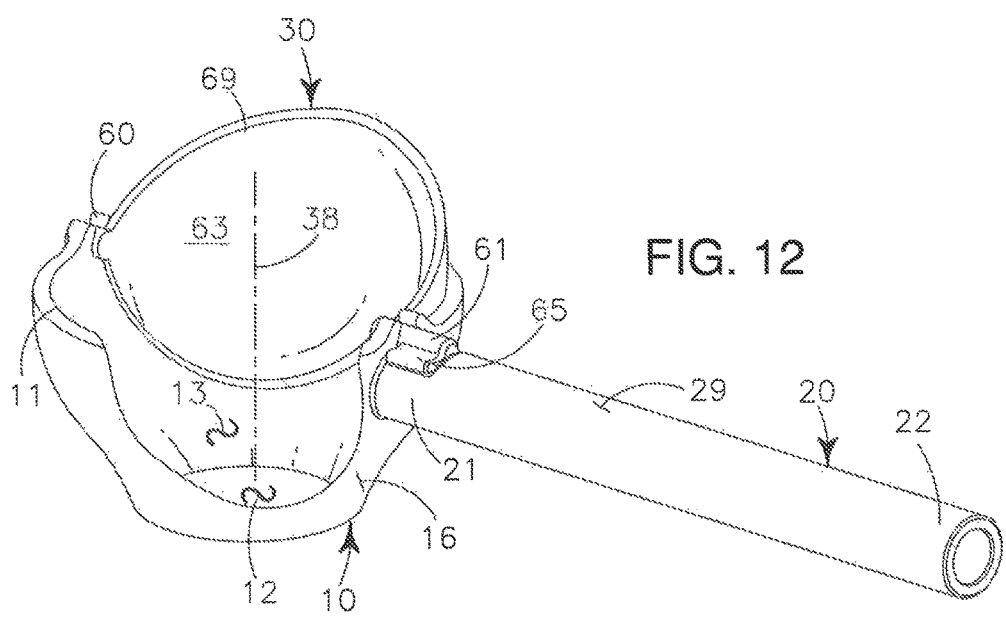
FIG. 12 is a partial cut-away isometric top, first side and handle end view of the gathering and dispensing scoop of FIG. 11 showing the sector shaped agitating gate valve pivoted to an open position.
Figure 18:
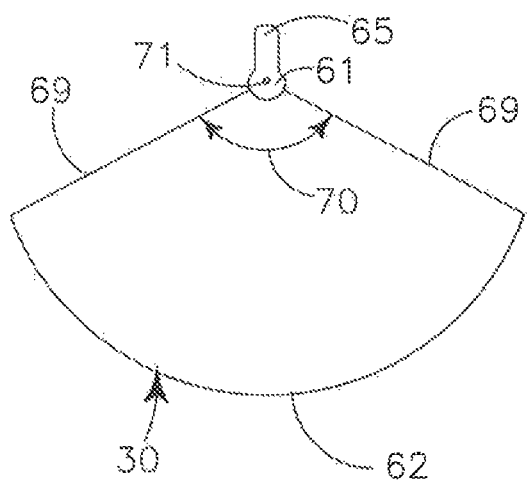
FIG. 18 is an orthographic handle end view of the agitating gate valve of FIG. 11 removed from the scoop body.
Figure 19:
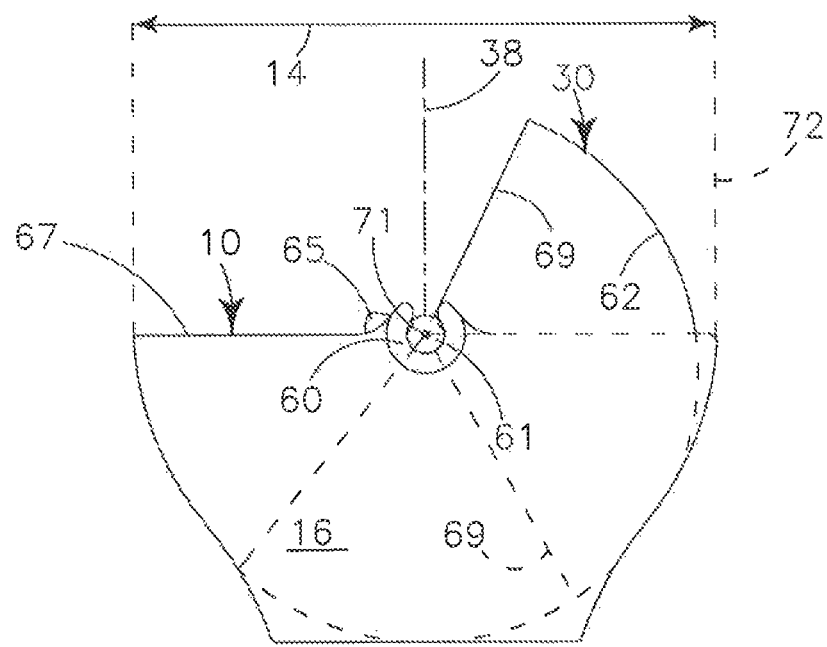
FIG. 19 is an enlarged orthographic scoop body end view similar to that of FIG. 17 showing the agitating gate valve pivoted to an open position showing the path of movement of the agitating gate valve in dashed outline.

When the gate valve 30 is in a closed position, as shown in FIGS. 11, 13, 16 and 17 the gate valve 30 obstructs the bottom opening 12. When the gate valve 30 is pivoted about pivot axles 61 on the axis of rotation 71 as shown in FIG. 12 and FIG. 19 the bottom opening 12 is unobstructed allowing product (not shown) within the volume 15 to pass through the bottom opening 12 and into an end-use container (not shown).

Finger tab 65 is structurally carried on one pivot axle 61. Preferably, the pivot axle 61 carrying the finger tab 65 is positioned within the axle support 60 adjacent the handle 20 so that the finger tab 65 is easily accessible by a user's thumb during operation. Manually moving the finger tab 65, as viewed from the handle 20 (FIG. 16), causes the gate valve 30 to pivot about the axles 61 causing the gate valve 30 to either obstruct/close the bottom opening 12 or pivot upwardly away from the bottom opening 12 to allow product (not shown) within the volume 15 to pass downwardly through the bottom opening 12.

Movement/rotation of the gate valve 30 on pivot axles 61 agitates product within the volume 15 and disrupts any surface tension that might exist within the product which might prevent the product from flowing through the bottom opening 12. Further, as shown in FIG. 19, when the gate valve 30 is pivoted about the axis of rotation 71 to release the product contained within the volume 15 through the bottom opening 12, lateral edge portions 69 of the gate valve 30 move in an arc that extends over the upper opening 11 towards the axis of rotation 71 of the gate valve 30. Because the lateral edge portion 69 of the gate valve 30 never passes laterally outwardly of a line 72 tangent to an upper circumferential edge 67 of the scoop body 10, product within the volume 15 is not pushed up and over the upper circumferential edge 67 of the scoop body 10 by movement of the gate valve 30. Rather, any product that is displaced by movement of the gate valve 30 is pushed laterally inwardly toward the axis of rotation 71 of the gate valve 30 which minimizes any product spillage caused by operation of the gate valve 30.

The gate valve 30 may be detached from the scoop body 10 for cleaning, maintenance and the like by removing the pivot axles 61 from the axle supports 60.

Bottom surface 24 of the handle 20 proximate the scoop body 10 may define a cavity 28 into which the finger tab 65 of another scoop may be carried if various sizes of scoops are stacked together with the scoop body 10 of one scoop carried within the channel 13 of a larger scoop body 10. (FIG. 15).

Figure 22:
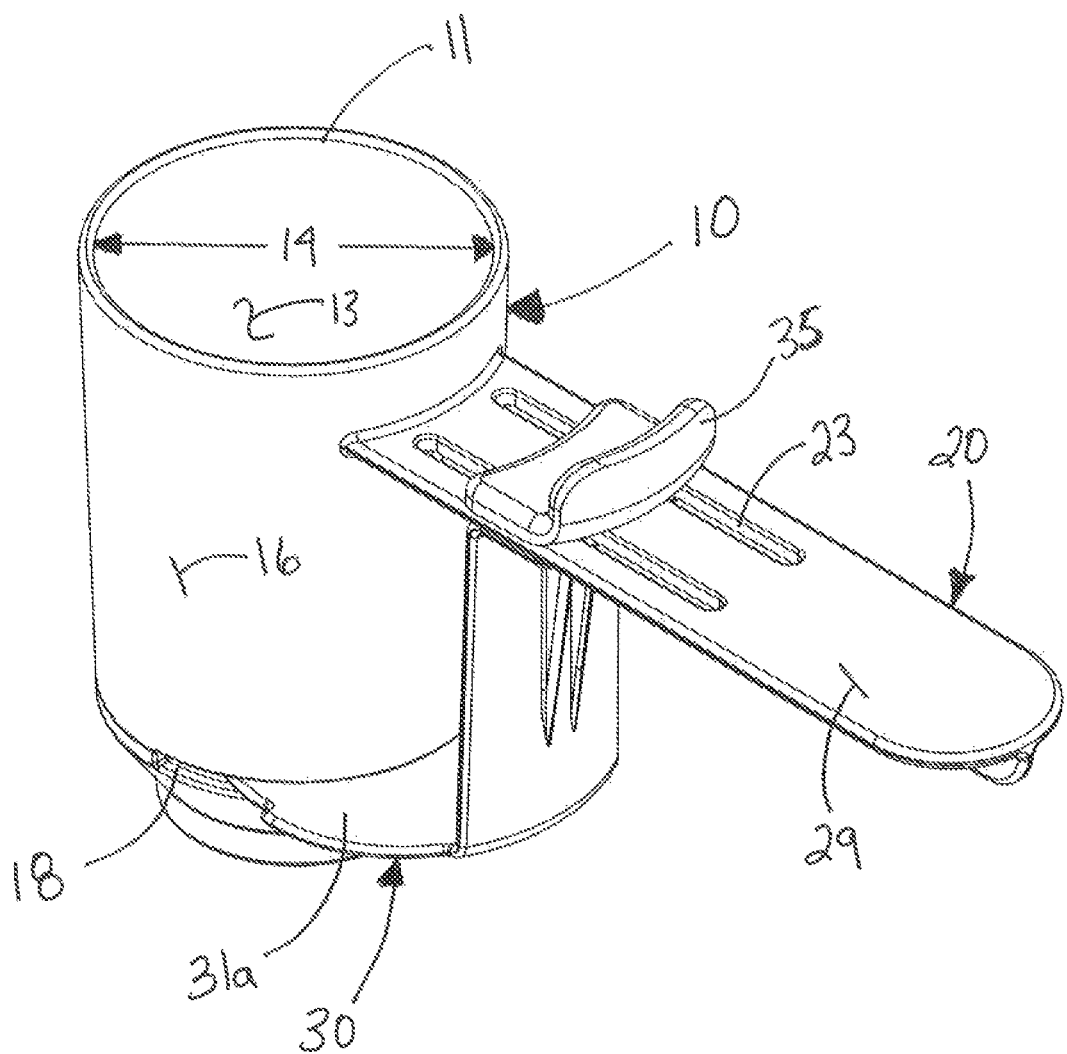
FIG. 22 is an isometric top, first side and handle end view of a sixth embodiment of my gathering and dispensing scoop similar to that shown in FIGS. 9, 10, 10*a* showing the handle and the gate valve vertically offset from one another and the agitating gate valve partially opened, this sixth embodiment configured to provide for co-axial stacking of differing sized scoops.

In a further contemplated embodiment that facilitates stacking of various sizes of scoops (FIG. 22) the handle 20 is carried by the scoop body 10 spacedly adjacent the upper opening 11 and extends radially from an outer circumferential wall 16 of the scoop body 10. The gate valve 30 is vertically offset from the handle portion 32 which communicates with finger grip 35 carried on an upper surface 29 of the handle 20. The finger grip 35 is releasably joined to the handle portion 32 of the gate valve 30 by lugs (not shown) that extend through the gate valve tracks 23 defined in the handle 20 to engage with the handle portion 32 of the gate valve 30. Forward and rearward movement of the finger grip 35 along with the handle 20 causes the gate valve 30 to open and close the bottom opening 12 by transecting the channel 13, and by being removed from the channel 13. The vertical offsetting of the handle 20 and gate valve 30 permits co-axial stacking of various sized scoops.

Figure 21:
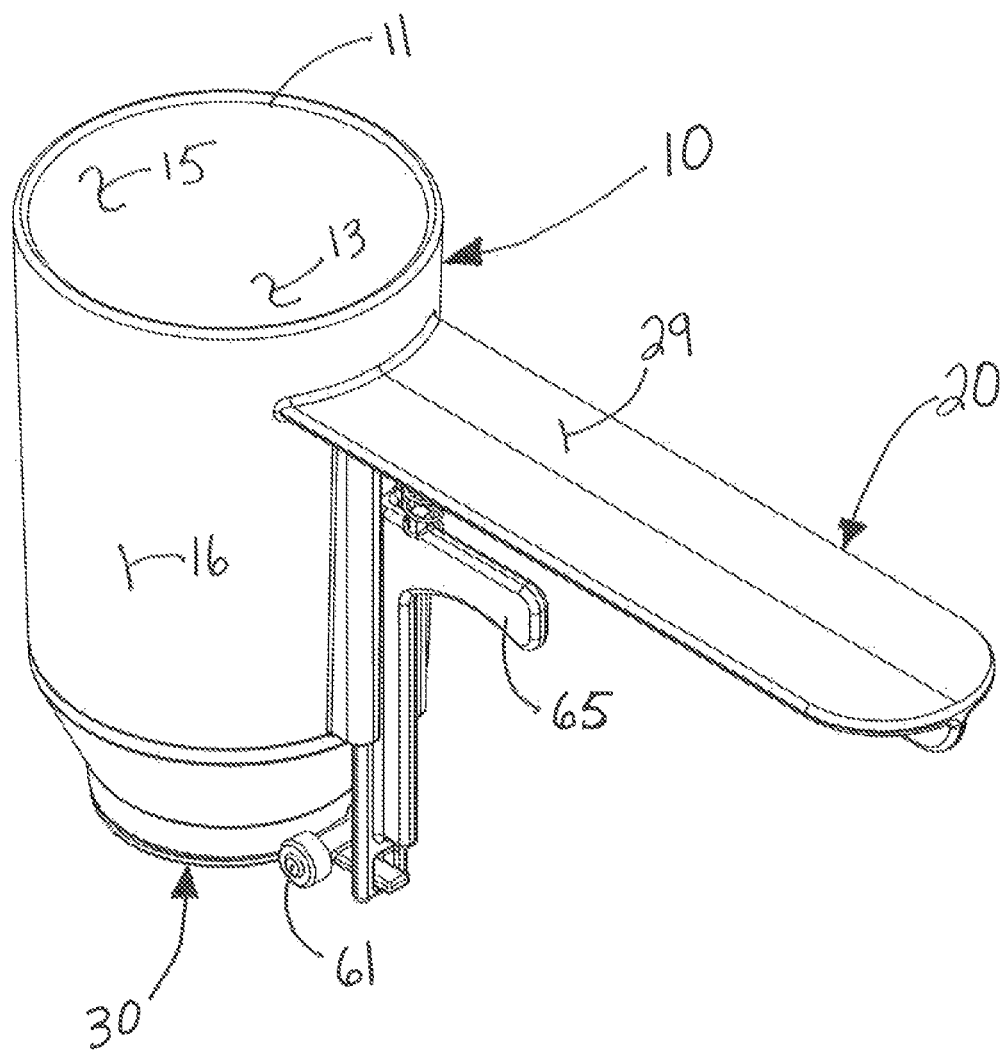
FIG. 21 is an isometric top, first side and handle end view of a fifth embodiment of my gathering and dispensing scoop showing a trigger type finger grip to activate a "trap door" type gate valve.

In still another embodiment (FIG. 21) it is contemplated the gate valve 30 is "trap-door" like and is pivotal on a pivot axle 61 to close the channel 13 and obstruct the bottom opening 12. In this contemplated embodiment the gate valve 30 is moved by a user's thumb manually moving the finger tab 65 or by means of a trigger 65 (FIG. 21) which is positioned proximate the scoop body 10 on the handle 20 and spacedly adjacent the upper opening 11 of the scoop body 10. A strengthening boss carried on the outer peripheral wall 16 of the scoop body 10 may journal the pivot axle 61 to add rigidity.

The embodiment shown in FIG. 20 is similar to that shown in FIG. 2 except that the gate valve 30 is vertically offset from the handle 20, and the gate valve 30 is user operated by a finger tab 65 carried on a pivot axle 80 that communicates between the gate valve 30 and the handle 20. The embodiment of FIG. 20 is similar to that of FIG. 22 in that it is also configured for co-axial stacking of varying sizes of gathering and dispensing scoops with smaller sized scoops carried/stacked within the volume 15 of larger sized scoops.

Construction and Materials of the Apparatus

The scoop body 10, the handle 20 and the gate valve 30 are preferably formed of a type of plastic or other food safe material such as but not limited to stainless steel through known methods such as injection molding, blow molding, vacuum forming, roto-molding, casting and stamping. It is preferable that the scoop body 10 and handle 20 be formed in a unitary piece, and that the gate valve 30 similarly be formed in a unitary piece, separately from the scoop body 10.

The molding process, be it injection molding, blow molding, vacuum forming or roto-molding, is preferable to keep costs at a minimum and also to form the various elements of the apparatus, including the angles, depressions and slots defined therein. However, other manufacturing techniques which are similarly known may similarly be used if, for instance, "high end" cooking scoops are being manufactured of stainless steel, in which case known manufacturing techniques for stainless steel and metal alloys would be used.

Having described the structure of my gathering and dispensing scoop with gate valve, its operation may be understood.

Assuming the scoop is not within a container (not shown) of product, and is readily accessible for use, a user would grasp the handle 20 with one hand and position it so that the user's fingers wrap around the handle 20 and preferably the user's thumb (not shown) is in frictional communication with the handle portion 32 of the gate valve 30. Assuming the gate valve 30 is in an open position (FIG. 2) the user should push the channel blocking portion 31 of the gate valve 30 laterally toward the gate valve slot 18 so that the gate valve 30 pivots on pivot axle 80. When the channel blocking portion 31 of the gate valve 30 has fully transected the channel 13 and closed the bottom opening 12, the first lateral edge 82 of the handle portion 32 should be in frictional contact with the rotation limiting lip 85 and the locking tab 84 shall engage with the locking notch 81 to positionally maintain the gate valve 30 in a closed position.

The scoop body 10 is maneuvered into the container (not shown) through an opening orifice (not shown) defined therein and is maneuvered such that a quantity of the material is gathered within the volume 15. The material enters the volume 15 through the upper opening 11 and passes into the volume 15, completely filling the volume 15 because any air bubbles and the like that might form pass through the gate valve slot 18 or through the bottom opening 12. The product gathered in the volume 15 frictionally rests upon an upper surface of the gate valve 30 that is transecting the channel 13 and obstructing the bottom opening 12. If desired, the user may remove any "heaping" amounts of the product off the top of the scoop body 10 so that the quantity of product is consistent.

The user would then maneuver the filled scoop body 10 to a position adjacent above an opening orifice (not shown) of a container, such as a water bottle (not shown), or baby bottle (not shown). The user would then maneuver the scoop body 10 into position wherein the bottom opening 12 of the scoop body 10 is in frictional contact with an upper edge portion (not shown) of the end-use container. The user then, with his/her thumb, operates the locking tab 84 which allows the gate valve 30 to move to an open position. Operation of the gate valve 30 effectively opens the channel 13 by removing the obstructing gate valve 30, which allows the product within the volume 15 to pass downwardly, under the influence of gravity, through the channel 13 and out through the bottom opening 12 for depositing in the end-use container. If additional product is to be gathered and deposited into the end-use container, the process described above, is repeated. Movement of the gate valve 30 agitates the product (not shown) within the volume 15, which encourages the product to flow and disrupts surface tension that may exist within the product.

The radially inward and downward shape of the inner circumferential surface 56 of the annular ring 55 positioned adjacent above the gate valve slot 18 within the channel 13 imparts some amount of radially inward movement to the product (not shown) within the volume 15 so that the product (not shown) does not flow out through the gate valve slot 18 when the gate valve 30 is opened.

Interpretation Notes

The above description has set out various features, functions, methods and other aspects of the invention. This has been done with regard to the currently preferred embodiments thereof. Time and further development may change the manner in which the various aspects are implemented. Such aspects may further be added to by the language of the claims which are incorporated by reference hereinto as originally filed. The scope of protection accorded the invention, as defined by the claims, is not intended to be necessarily limited to the specific sizes, shapes, features or other aspects of the currently preferred embodiment shown and described. The claimed invention may be implemented or embodied in other forms still being within the concepts shown, described and claimed herein. Also included are equivalents of the invention which can be made without departing from the scope or concepts properly protected hereby.

The foregoing description of my invention is necessarily of a detailed nature so that a specific embodiment of a best mode may be set forth as is required, but it is to be understood that various modifications of details, sizes, and rearrangement, substitution and multiplication of the parts may be resorted to without departing from its spirit, essence or scope.

Having thusly described my invention, the preferred embodiment and its use, I pray issuance of UTILITY LETTERS PATENT.

The invention claimed is:

1. A scoop for gathering and dispensing a quantity of a flowable solid comprising:
    a scoop body defining an upper opening and a bottom opening spaced apart from the upper opening, the scoop body having an outer circumferential surface and defines a channel communicating between the upper opening and the bottom opening, and the channel communicating between the upper opening and the bottom opening further defines an axis;
    a handle having a first end portion communicating with the outer circumferential surface of the scoop body and a second end portion spaced apart from the scoop body;
    a gate valve that pivots on an axis that extends parallel to the axis of the channel and the gate valve is movable between a first position obstructing the bottom opening and a second position not obstructing the bottom opening, and movement of the gate valve between the first position and the second position is perpendicular to the axis defined by the channel;
    a gate valve slot defined in the outer circumferential surface of the scoop body spacedly adjacent the bottom opening, the gate valve slot extending diametrically across the scoop body parallel to an axis of the handle; and
    the gate valve is movable between the first position within the gate valve slot completely transecting the channel defined by the scoop body and completely obstructing the bottom opening and the second position withdrawn from the gate valve slot, the gate valve having a planar channel blocking portion at a first end-portion that is movable into and out of the gate valve slot and further having a handle portion extending radially from the planar channel blocking portion, and the planar channel blocking portion has a diameter that is larger than diameter of the channel defined by the scoop body immediately adjacent above the gate valve slot.

2. The scoop of claim 1 wherein:
    the gate valve pivots on an axle carried by the handle.

3. A scoop for gathering and dispensing a quantity of a flowable solid comprising in combination:
    a scoop body defining an upper opening and a bottom opening spaced apart from the upper opening, the scoop body having an outer circumferential surface and defining a channel communicating between the upper opening and the bottom opening;
    a handle extending radially from the scoop body having a first end portion communicating with the outer circumferential surface of the scoop body and a second end portion spaced apart from the scoop body;
    a gate valve slot defined in the outer circumferential surface of the scoop body vertically spaced apart from the interconnection of the handle and the scoop body;

a gate valve communicating with the handle and movable between a first position within the gate valve slot obstructing the bottom opening and a second position withdrawn from the gate valve slot, the gate valve having a planar channel blocking portion that is movable into and out of the gate valve slot and a handle portion.

4. The scoop of claim 3 further comprising:
a pivot axle extending parallel to an axis of the scoop body channel interconnecting the handle and the gate valve so that the gate valve may pivot between the first position and the second position.

5. The scoop of claim 3 further comprising:
a spring biasing the gate valve to one position.

* * * * *

UNITED STATES PATENT AND TRADEMARK OFFICE
CERTIFICATE OF CORRECTION

PATENT NO. : 9,771,251 B2  
APPLICATION NO. : 14/803498  
DATED : September 26, 2017  
INVENTOR(S) : Susan A. Thomson Page 1 of 1

It is certified that error appears in the above-identified patent and that said Letters Patent is hereby corrected as shown below:

Claim 1, Line 21: Delete the word "defines" and insert the word -- defining --.

Claim 1, Line 22: Delete the "," after the word -- opening -- and insert a -- ; --.

Signed and Sealed this  
Fifth Day of December, 2017

Joseph Matal  
*Performing the Functions and Duties of the*  
*Under Secretary of Commerce for Intellectual Property and*  
*Director of the United States Patent and Trademark Office*